United States Patent
Tikhostoup et al.

(10) Patent No.: US 12,265,441 B2
(45) Date of Patent: Apr. 1, 2025

(54) GRAPHICS PROCESSING UNIT (GPU) SELECTION BASED ON A UTILIZED POWER SOURCE

(71) Applicants: ADVANCED MICRO DEVICES, INC., Santa Clara, CA (US); ATI TECHNOLOGIES ULC, Markham (CA)

(72) Inventors: Dmitri Tikhostoup, Markham (CA); Vladimir Giemborek, Markham (CA); William Herz, Santa Clara, CA (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/218,795

(22) Filed: Mar. 31, 2021

(65) Prior Publication Data
US 2022/0317756 A1 Oct. 6, 2022

(51) Int. Cl.
G06F 1/3287 (2019.01)
G06F 1/26 (2006.01)
G06F 1/3293 (2019.01)
G06T 1/20 (2006.01)

(52) U.S. Cl.
CPC ............ *G06F 1/3287* (2013.01); *G06F 1/263* (2013.01); *G06F 1/3293* (2013.01); *G06T 1/20* (2013.01)

(58) Field of Classification Search
CPC ...... G06F 1/3287; G06F 1/263; G06F 1/3293; G06T 1/20
See application file for complete search history.

(56) References Cited

U.S. PATENT DOCUMENTS

| | | | |
|---|---|---|---|
| 8,259,119 B1* | 9/2012 | Diard | G06F 1/3293 345/503 |
| 2007/0077887 A1* | 4/2007 | Kuwabara | H04W 52/0274 455/39 |
| 2010/0220102 A1* | 9/2010 | Wyatt | G06F 3/1438 345/502 |
| 2010/0245366 A1* | 9/2010 | Nath | G09G 5/363 345/502 |
| 2010/0332799 A1 | 12/2010 | Sonobe | |
| 2011/0063309 A1* | 3/2011 | Diard | G06F 9/455 715/764 |
| 2012/0054502 A1* | 3/2012 | Chueh | G06F 1/26 713/300 |

(Continued)

FOREIGN PATENT DOCUMENTS

WO 2007140404 A2 12/2007

OTHER PUBLICATIONS

International Search Report and Written Opinion, PCT/US2022/021931, Aug. 29, 2022, 17 pages.

*Primary Examiner* — Sing-Wai Wu
*Assistant Examiner* — Khoa Vu

(57) ABSTRACT

Graphics processing unit (GPU) selection based on a utilized power source, including: determining that an apparatus is using a direct current (DC) power source instead of an Alternating Current (AC) power source; and causing, in response to the apparatus using the DC power source, the apparatus to preferentially utilize an integrated graphics processing unit (iGPU) over a discrete graphics processing unit (dGPU) while using the DC power source.

18 Claims, 9 Drawing Sheets

(56) References Cited

U.S. PATENT DOCUMENTS

2013/0176322 A1\* 7/2013 Bakalash .............. G06F 1/3212
　　　　　　　　　　　　　　　　　　　　　345/522
2015/0177822 A1\* 6/2015 Shoshan ............... G06T 15/005
　　　　　　　　　　　　　　　　　　　　　345/522
2018/0082397 A1\* 3/2018 Bobrovsky ............. G06F 9/544
2018/0308199 A1\* 10/2018 Vembu .................. G06T 15/506

\* cited by examiner

Determine That An Apparatus Is Using A Direct Current (DC) Power Source Instead Of An Alternating Current (AC) Power Source 202

Cause, In Response To The Apparatus Using The DC Power Source, The Apparatus To Preferentially Utilize An Integrated Graphics Processing Unit (iGPU) Over A Discrete Graphics Processing Unit (dGPU) While Using The DC Power Source 204

FIG. 2

Determine That An Apparatus Is Using A Direct Current (DC) Power Source Instead Of An Alternating Current (AC) Power Source 202

Cause, In Response To The Apparatus Using The DC Power Source, The Apparatus To Preferentially Utilize An Integrated Graphics Processing Unit (iGPU) Over A Discrete Graphics Processing Unit (dGPU) While Using The DC Power Source 204

Shut Down The dGPU 302

FIG. 3

Determine That An Apparatus Is Using A Direct Current (DC) Power Source Instead Of An Alternating Current (AC) Power Source 202

Cause, In Response To The Apparatus Using The DC Power Source, The Apparatus To Preferentially Utilize An Integrated Graphics Processing Unit (iGPU) Over A Discrete Graphics Processing Unit (dGPU) While Using The DC Power Source 204

Shut Down The dGPU 302

Activate The dGPU In Response To A Display Connection To The dGPU 402

FIG. 4

Determine That An Apparatus Is Using A Direct Current (DC) Power Source Instead Of An Alternating Current (AC) Power Source 202

Cause, In Response To The Apparatus Using The DC Power Source, The Apparatus To Preferentially Utilize An Integrated Graphics Processing Unit (iGPU) Over A Discrete Graphics Processing Unit (dGPU) While Using The DC Power Source 204

Cause The iGPU And The dGPU To Exit An Operational Mode Prioritizing The dGPU Over The iGPU For Rendering 502

FIG. 5

```
┌─────────────────────────────────────────────────────────────────────┐
│  Determine That An Apparatus Is Using A Direct Current (DC) Power   │
│  Source Instead Of An Alternating Current (AC) Power Source 202     │
└─────────────────────────────────────────────────────────────────────┘
                                  │
                                  ▼
┌─────────────────────────────────────────────────────────────────────┐
│  Cause, In Response To The Apparatus Using The DC Power Source,     │
│  The Apparatus To Preferentially Utilize An Integrated Graphics     │
│  Processing Unit (iGPU) Over A Discrete Graphics Processing Unit    │
│  (dGPU) While Using The DC Power Source 204                         │
│                                                                     │
│   ┌─────────────────────────────────────────────────────────────┐   │
│   │  Detect A Runtime Event Associated With An Application 602  │   │
│   └─────────────────────────────────────────────────────────────┘   │
│                                 │                                   │
│                                 ▼                                   │
│   ┌─────────────────────────────────────────────────────────────┐   │
│   │  In Response To The Run-Time Event, Update A Preference     │   │
│   │  Associated With The Application To Use The iGPU For        │   │
│   │  Rendering 604                                              │   │
│   └─────────────────────────────────────────────────────────────┘   │
└─────────────────────────────────────────────────────────────────────┘
```

FIG. 6

Determine That An Apparatus Is Using A Direct Current (DC) Power Source Instead Of An Alternating Current (AC) Power Source 202

Display A Notification Indicating One Or More Executed Applications Should Be Restarted 702

Cause, In Response To The Apparatus Using The DC Power Source, The Apparatus To Preferentially Utilize An Integrated Graphics Processing Unit (iGPU) Over A Discrete Graphics Processing Unit (dGPU) While Using The DC Power Source 204

FIG. 7

Determine That An Apparatus Is Using A Direct Current (DC) Power Source Instead Of An Alternating Current (AC) Power Source 202

Request, From A User, A Selection Of Whether To Prioritize Using The iGPU Over The dGPU While Using The DC Power Source 802

Cause, In Response To The Apparatus Using The DC Power Source, The Apparatus To Preferentially Utilize An Integrated Graphics Processing Unit (iGPU) Over A Discrete Graphics Processing Unit (dGPU) While Using The DC Power Source 204

FIG. 8

```
┌─────────────────────────────────────────────────────────────┐
│ Determine That An Apparatus Is Using A Direct Current (DC)  │
│ Power Source Instead Of An Alternating Current (AC) Power   │
│ Source 202                                                  │
└─────────────────────────────────────────────────────────────┘
                              │
                              ▼
┌─────────────────────────────────────────────────────────────┐
│ Cause, In Response To The Apparatus Using The DC Power      │
│ Source, The Apparatus To Preferentially Utilize An          │
│ Integrated Graphics Processing Unit (iGPU) Over A Discrete  │
│ Graphics Processing Unit (dGPU) While Using The DC Power    │
│ Source 204                                                  │
└─────────────────────────────────────────────────────────────┘
                              │
                              ▼
┌─────────────────────────────────────────────────────────────┐
│ Detect A Power Transition Event From Using The DC Power     │
│ Source To Using The AC Power Source In The Apparatus 902    │
└─────────────────────────────────────────────────────────────┘
                              │
                              ▼
┌─────────────────────────────────────────────────────────────┐
│ End, In Response To The Power Transition Event, The         │
│ Apparatus Preferentially Utilizing The iGPU Over The        │
│ dGPU 904                                                    │
└─────────────────────────────────────────────────────────────┘
```

FIG. 9

GRAPHICS PROCESSING UNIT (GPU) SELECTION BASED ON A UTILIZED POWER SOURCE

BACKGROUND

Some portable computing devices intended for high-performance video processing, such as gaming-oriented laptops, will include an integrated graphics processing unit (iGPU) and a discrete graphics processing unit (dGPU) as a peripheral component for accelerated graphics processing. In some implementations, the iGPU achieves better performance than the dGPU when using DC power, while the dGPU achieves better performance than the iGPU when using AC power.

BRIEF DESCRIPTION OF THE DRAWINGS

FIG. 2 is a flowchart of an example method for GPU selection based on a utilized power source according to some embodiments.

FIG. 3 is a flowchart of another example method for GPU selection based on a utilized power source according to some embodiments.

FIG. 4 is a flowchart of another example method for GPU selection based on a utilized power source according to some embodiments.

FIG. 5 is a flowchart of another example method for GPU selection based on a utilized power source according to some embodiments.

FIG. 6 is a flowchart of another example method for GPU selection based on a utilized power source according to some embodiments.

FIG. 7 is a flowchart of another example method for GPU selection based on a utilized power source according to some embodiments.

FIG. 8 is a flowchart of another example method for GPU selection based on a utilized power source according to some embodiments.

FIG. 9 is a flowchart of another example method for GPU selection based on a utilized power source according to some embodiments.

DETAILED DESCRIPTION

Figure 1:
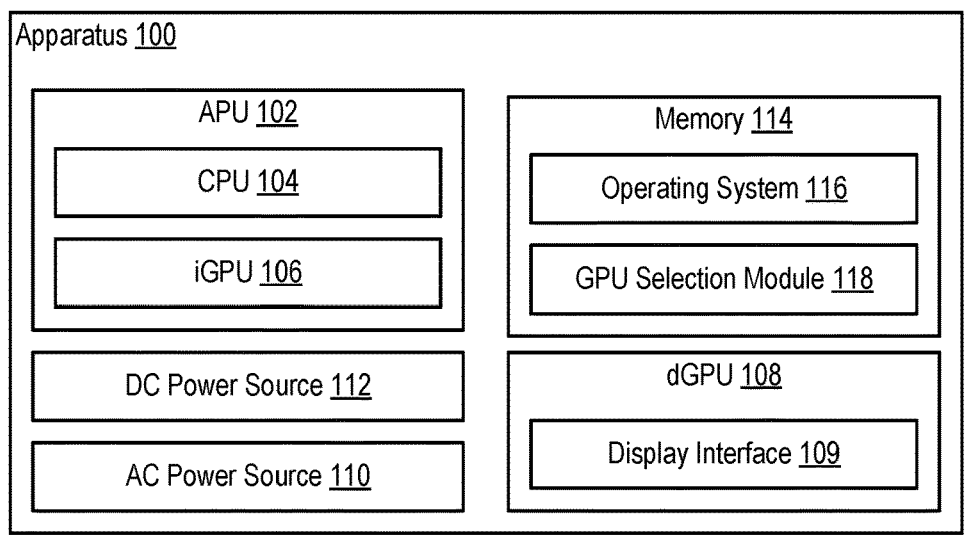
FIG. 1 is a block diagram of an example apparatus for graphics processing unit (GPU) selection based on a utilized power source according to some embodiments.

In some embodiments, a method for graphics processing unit (GPU) selection based on a utilized power source includes: determining that an apparatus is using a direct current (DC) power source instead of an Alternating Current (AC) power source; and causing, in response to the apparatus using the DC power source, the apparatus to preferentially utilize an integrated graphics processing unit (iGPU) over a discrete graphics processing unit (dGPU) while using the DC power source.

In some embodiments, causing the apparatus to preferentially utilize the iGPU over the dGPU includes shutting down the dGPU. In some embodiments, the method further includes activating the dGPU in response to a display connection to the dGPU. In some embodiments, causing the apparatus to preferentially utilize the iGPU over the dGPU includes causing the iGPU and the dGPU to exit an operational mode prioritizing the dGPU over the iGPU for rendering. In some embodiments, exiting the operational mode by the iGPU and the dGPU is performed via a dGPU driver reload. In some embodiments, causing the apparatus to preferentially utilize the iGPU over the dGPU includes: detecting a runtime event associated with an application; and in response to the runtime event, updating a preference associated with the application to use the iGPU for rendering. In some embodiments, the method further includes displaying a notification indicating one or more executed applications should be restarted. In some embodiments, the method further includes requesting, from a user, a selection of whether to prioritize using the iGPU over the dGPU while using the DC power source. In some embodiments, the method further includes detecting a power transition event from using the AC power source to using the DC power source in the apparatus; and ending, in response to the power transition event, the apparatus preferentially utilizing the iGPU over the dGPU.

In some embodiments, an apparatus for GPU selection based on a utilized power source includes: an iGPU; a GPU; and the apparatus performs steps including: determining that an apparatus is using a DC power source instead of an AC power source; and causing, in response to the apparatus using the DC power source, the apparatus to preferentially utilize an iGPU over a dGPU while using the DC power source.

In some embodiments, causing the apparatus to preferentially utilize the iGPU over the dGPU includes shutting down the dGPU. In some embodiments, the steps further include activating the dGPU in response to a display connection to the dGPU. In some embodiments, causing the apparatus to preferentially utilize the iGPU over the dGPU includes causing the iGPU and the dGPU to exit an operational mode prioritizing the dGPU over the iGPU for rendering. In some embodiments, exiting the operational mode by the iGPU and the dGPU is performed via a dGPU driver reload. In some embodiments, causing the apparatus to preferentially utilize the iGPU over the dGPU includes: detecting a runtime event associated with an application; and in response to the runtime event, updating a preference associated with the application to use the iGPU for rendering. In some embodiments, the steps further include displaying a notification indicating one or more executed applications should be restarted. In some embodiments, the steps further include requesting, from a user, a selection of whether to prioritize using the iGPU over the dGPU while using the DC power source. In some embodiments, the steps further include detecting a power transition event from using the AC power source to using the DC power source in the apparatus; and ending, in response to the power transition event, the apparatus preferentially utilizing the iGPU over the dGPU.

In some embodiments, a computer program product disposed upon a non-transitory computer readable medium includes computer program instructions for GPU selection based on a utilized power source, that, when executed, cause a computer system to perform steps included: determining that an apparatus is using a DC power source instead of an AC power source; and causing, in response to the apparatus using the DC power source, the apparatus to preferentially utilize an iGPU over a dGPU while using the DC power source.

In some embodiments, the steps further include: detecting a power transition event from using the AC power source to using the DC power source in the apparatus; and ending, in response to the power transition event, the apparatus preferentially utilizing the iGPU over the dGPU.

Some portable computing devices intended for high-performance video processing, such as gaming-oriented laptops, will include multiple graphics processing units (GPUs). For example, a laptop includes an Accelerated Processing Unit (APU) including a central processing unit (CPU) and an integrated graphics processing unit (iGPU) on a single die. In addition to the iGPU, the laptop includes a discrete graphics processing unit (dGPU) as a peripheral component for accelerated graphics processing.

Such a laptop will be capable of being powered by both an alternating current (AC) adapter to be plugged into a wall socket or other outlet, as well as by a battery when not plugged into a power source. Many operating systems and applications operate under the assumption that the dGPU will provide better overall performance compared to the iGPU and will preferentially use the dGPU for rendering or other processes. While it is reasonable to assume that the dGPU will always provide better performance than the iGPU, in some systems the iGPU provides superior performance when the system is operating on direct current (DC) power (e.g., a battery), while the dGPU provides superior performance when the system is operating on AC power (e.g., from a wall outlet). Accordingly, when on DC power and where the dGPU is selected as the preferred video adapter, the system does not achieve peak performance. Moreover, power consumption suffers as the dGPU must be powered while nonetheless providing inferior performance.

To address these concerns, FIG. 1 is a block diagram of a non-limiting example apparatus 100 for graphics processing unit (GPU) selection based on a utilized power source. The example apparatus 100 can be implemented as a variety of computing devices, including mobile devices, laptop computers, and the like. The apparatus 100 includes an Accelerated Processing Unit (APU) 102. The APU 102 is a microprocessor that includes a central processing unit (CPU) 104 and integrated graphics processing unit (iGPU) 106 on a single die. The apparatus 100 also includes a discrete graphics processing unit (dGPU) 108. Although the approaches set forth herein are described in the context of an apparatus 100 including a dGPU 108 and an APU 102 with an iGPU 106, it is understood that the approaches set forth herein are applicable to any system or device incorporating both integrated and discrete GPUs. The dGPU 108 is a peripheral or additional component of the apparatus operatively coupled to the APU 102. For example, in some embodiments the dGPU 108 is operatively coupled to the APU 102 by a peripheral component interface express (PCIe) bus. Accordingly, in such an embodiment, the dGPU 108 is installed in a PCIe port on a motherboard or other printed circuit board (PCB) into which the APU 102 is installed. By virtue of the operable connection between the APU 102 and the dGPU 108, the APU 102 is capable of issuing instructions, rendering jobs, and the like, to the dGPU 108. In some embodiments, the dGPU 108 includes a display interface 109. The display interface 109 is a port or socket to which an external monitor or display is connected. The display interface 109 provides a video signal to the external display for presentation. The display interface 109 includes, for example, a High Definition Multimedia Interface (HDMI) port, a Video Graphics Array (VGA) port, a Digital Visual Interface (DVI) port, a Universal Serial Bus C (USB-C) port, or other display port as can be appreciated.

The apparatus 100 includes an AC power source 110. In some embodiments, the AC power source 110 includes a port or interface for an AC adapter that converts an external AC current into DC power for use by the apparatus 100 to power and charge various components. The apparatus 100 also includes a DC power source 112. The DC power source 112 includes, for example, a battery or other internal power source as can be appreciated.

The apparatus 100 also includes memory 114 such as Random Access Memory (RAM). Stored in memory 114 is an operating system 116 and a GPU selection module 118. The operating system 116 and GPU selection module 118 in the example of FIG. 1 are shown in memory 114, but many components of such software typically are stored in non-volatile memory also, such as, for example, on a disk drive or other storage medium. Operating systems 116 useful in the apparatus 100 according to certain embodiments include UNIX™, Linux™, Microsoft Windows™, and others as will occur to those of skill in the art.

The GPU selection module 118 is a module for graphics processing unit (GPU) selection based on a utilized power source according to embodiments of the present disclosure. The GPU selection module 118 is capable of being implemented at various levels of a software hierarchy, including the driver level, the service level, the application level, and combinations thereof. To facilitate graphics processing unit (GPU) selection based on a utilized power source, the GPU selection module 118 detects power transition events between the apparatus 100 using AC power via the AC power source 110 and DC power via the DC power source 112.

As an example, the GPU selection module 118 determines that the apparatus 100 is using the DC power source 112 instead of the AC power source 110. For example, in some embodiments, the GPU selection module 118 determines that the apparatus 100 is using the DC power source 112 at start up or booting of the apparatus 100. As another example, in some embodiments, the GPU selection module 118 determines that the apparatus 100 is using the DC power source 112 in response to a power transition event where the apparatus switches from using the AC power source 110 to the DC power source 112. As an example, the apparatus 100 switches from using the AC power source 110 to the DC power source 112 in response to unplugging the apparatus from an external power source or in response to the external power source failing to provide power via the AC power source 110 (e.g., in the event of a power outage). The apparatus 100 then switches to using the internal, DC power source 112.

In response to the apparatus 100 using the DC power source 112, the GPU selection module 118 causes the apparatus 100 to preferentially utilize the iGPU 106 over a dGPU 108 while using the DC power source 112. Assume that the operating system 116 or applications executed in the apparatus 100 are configured to utilize the dGPU 108 for rendering or other operations while the apparatus is using the AC power source 110. In response to determining that the apparatus 100 is using the DC power source 112, the GPU selection module 118 causes the apparatus 100 to use the iGPU 106 instead of the dGPU 108. Thus, services or applications that would send instructions or jobs to the dGPU 108 are instead sent to the iGPU 106.

In some embodiments, the GPU selection module 118 causes the apparatus 100 to preferentially utilize the iGPU 106 over the dGPU 108 by shutting down the dGPU 108. For example, the GPU selection module 118 causes the dGPU 108 to enter a Bus-Off-Chip-Mode (e.g., a D3 cold state), effectively powering off the dGPU 108. As the dGPU 108 is powered off or running at an extremely reduced power consumption state, the iGPU 106 becomes the only available option for rendering or graphics-related jobs. Accordingly, the operating system 116 or other applications will automatically select the iGPU 106 as the adapter for performing tasks that might otherwise be sent to the dGPU 108. In addition to the performance benefits of using the iGPU 106 while using the DC power source 112, power consumption of the apparatus 100 is improved as the dGPU 108 is drawing little to no power while shut down.

As is set forth above, the dGPU 108 includes a display interface 109 for connecting external displays. While the dGPU 108 is shut down, external displays connected to the display interface 109 would not function. Accordingly, in some embodiments, the GPU selection module 118 activates the dGPU 108 in response to a display connection to the dGPU 108. For example, in some embodiments, the display connection includes a plug-in event of a display to the display interface 109. As another example, in some embodiments, the display connection includes a powering on or activation of a display connected to the display interface 109. By activating the dGPU 108 in response to the display connection, in some embodiments, jobs or processes that would be sent to the iGPU 106 while the dGPU 108 is shut down will instead be sent to the activated dGPU 108. In other embodiments, activating the dGPU 108 in response to the display connection, jobs will be processed (e.g., rendered) by the iGPU 106 but presented for display by the dGPU 108.

Though the GPU selection module 118 is described above as reactivating the dGPU 108 in response to a display connection, one skilled in the art will appreciate that, in some embodiments, the GPU selection module 118 prevents or refrains from causing the apparatus 100 from preferentially utilizing the iGPU 106 over the dGPU 108 if there is a current display connection when it is determined that the apparatus 100 is using the DC power source 112. For example, assume that an external display is coupled to the dGPU 108 via the display interface 109 when a power supply to the AC power source 110 is unplugged. As there is currently a display connected, the GPU selection module 118 instead refrains from shutting down the dGPU 108.

In some embodiments, the GPU selection module 118 causes the apparatus 100 to preferentially utilize the iGPU 106 over the dGPU 108 by causing the iGPU 106 and the dGPU 108 to exit an operational mode prioritizing the dGPU 108 over the iGPU 106 for rendering. In some embodiments, the operating system 116 implements an operational mode that, while active and while the iGPU 106 and dGPU 108 are logically linked to the operational mode, causes the dGPU 108 to be preferentially used over the iGPU 106.

For example, a Windows™ operating system 116 includes a Hybrid Graphics (HG) mode that selects between any display adapters linked to (e.g., registered with) the HG mode. Particular applications registered with the HG mode have the operating system 116 select which of the linked display drivers to use for the rendering functions of the particular application. In this example, causing the iGPU 106 and the dGPU 108 to exit the operational mode includes unlinking the iGPU 106 and the dGPU 108 from the HG mode. In some embodiments, this is performed by causing a driver reload for the dGPU 108. By virtue of exiting the operational mode, some jobs will stop being issued to the dGPU 108. In some embodiments, if jobs stop being issued to the dGPU 108 altogether, this will cause the operating system 116 to put the dGPU 108 in a Bus-Off-Chip-Mode (D3 cold state), effectively shutting down the dGPU 108 and reducing overall power consumption. One skilled in the art will appreciate that, in some embodiments, though some applications will enumerate all available adapters (e.g., both the iGPU 106 and dGPU 108) and select the dGPU 108, the iGPU 106 will nonetheless be preferentially utilized for the majority of operations.

In some embodiments, applications registered with the operational mode (e.g., the HG mode) will select whatever adapter is driving the display of the apparatus 100. In this example, the iGPU 106 is driving the primary display (e.g., a built-in laptop monitor). Thus, the iGPU 106 will be utilized by the registered applications. In some embodiments, where the primary display is changed to an external monitor and the apparatus 100 is still using the DC power source 112, this causes the dGPU 108 to again become the default renderer for applications.

In some embodiments, the GPU selection module 118 causes the apparatus 100 to preferentially utilize the iGPU 106 over the dGPU 108 by detecting a runtime event associated with an application and, in response to the runtime event, update a preference associated with the application to use the iGPU 106 for rendering. The runtime event includes, for example a 3D runtime load event generated by an application. For example, a kernel-level portion of the GPU selection module 118 intercepts the runtime event and indicates, to the operating system 116, that the iGPU 106 is the preferred adapter for rendering. Thus, causing the iGPU 106 to be preferentially utilized is performed both in response to determining that the apparatus 100 is using the DC power supply 112 and also in response to a detected runtime event for an application.

In some embodiments, causing the apparatus 100 to preferentially utilize the iGPU 106 during execution of an application will cause the executed operation to crash. As an example, assume that an application is being executed and is using the dGPU 108 when the AC power supply 110 is disconnected from an external power source, causing the apparatus 100 to instead use the DC power source 112. Shutting down the dGPU 108, causing the apparatus 100 to preferentially utilize the iGPU 106 is performed via a driver reload, or intercepting a runtime event and identifying the iGPU 106 as the preferred adapter have the possibility of causing the application using the dGPU 108 to crash.

Accordingly, in some embodiments, the GPU selection module 118 displays a notification indicating that one or more executed applications should be restarted. The notification includes, for example, a pop-up notification or other user interface element. In some embodiments, the notification indicates the particular one or more executed applications that should be restarted. In some embodiments, the notification is displayed in response to determining that the apparatus 100 is using the DC power source 112. In some embodiments, the notification includes buttons or other user interface elements that, when selected, close or restart a corresponding application. In some embodiments, causing the apparatus 100 to preferentially utilize the iGPU 106 is delayed until a user interacts with the notification (e.g., dismissing it, selecting that the one or more applications should be restarted). In some embodiments, causing the apparatus 100 to preferentially utilize the iGPU 106 is delayed for a predefined amount of time after displaying the notification, thereby providing the user with some amount of time to shut down their applications prior to preferentially utilizing the iGPU 106.

In some embodiments, the GPU selection module 118 requests, from a user, a selection of whether to prioritize using the iGPU 106 over the dGPU 108 while using the DC power source 112. For example, in response to determining that the apparatus 100 is using the DC power source 112, the GPU selection module 118 displays a notification prompting the user to select whether they would like the iGPU 106 to be preferentially used while the apparatus 100 is on DC power. Thus, the user is allowed to make the determination as to whether they will receive the performance and power savings benefits afforded by using the iGPU 106. For example, if a user does not wish to shut down or restart any applications that would crash due to the transition of using the iGPU 106, the user will choose to continue using the dGPU 108 despite the degradation of performance.

In some embodiments, the GPU selection module 118 detects a power transition event from using the DC power source 112 to using the AC power source 110 in the apparatus 100. For example, an AC adapter or plug connects the AC power source 110 to an external power supply. The GPU selection module 118 then ends, in response to the power transition event, the apparatus 100 preferentially utilizing the iGPU 106 over the dGPU 108. In some embodiments, this includes waking or reactivating the dGPU 108. In some embodiments, this includes registering or entering the iGPU 106 and the dGPU 108 with an operational mode preferentially utilizing the dGPU 108 (e.g., the Hybrid Graphics mode). In some embodiments, this includes updating a preference to use the dGPU 108 by a particular application (e.g., in response to intercepting a runtime event such as a 3D runtime load event.

One skilled in the art will appreciate that, in some embodiments, the GPU selection module 118 determines to use the iGPU 106 over the dGPU 108 based at least in part on a user preference or selection. For example, in some embodiments, an operating system includes configuration options for preferring battery life over performance. As an example, a "better battery" option causes the GPU selection module 118 to use the iGPU 106 over the dGPU 108 while a "better performance" option causes the GPU selection module 118 to use the dGPU 108 over the iGPU 106 (e.g., independent of a currently used power source).

One skilled in the art will appreciate that, in some embodiments, the approaches set forth herein for selecting between an iGPU 106 and a dGPU 108 are also applicable to selecting between an iGPU 106 and an external GPU (xGPU).

For further explanation, FIG. 2 sets forth a flow chart illustrating an example method for graphics processing unit (GPU) selection based on a utilized power source that includes determining 202 (e.g., by a GPU selection module 118) that an apparatus 100 is using a DC power source 112 instead of an AC power source 110. For example, in some embodiments, the GPU selection module 118 determines 202 that the apparatus 100 is using the DC power source 112 at start up or booting of the apparatus 100. As another example, in some embodiments, the GPU selection module 118 determines 202 that the apparatus 100 is using the DC power source 112 in response to a power transition event where the apparatus switches from using the AC power source 110 to the DC power source 112. As an example, the apparatus 100 switches from using the AC power source 110 to the DC power source 112 in response to unplugging the apparatus from an external power source or in response to the external power source failing to provide power via the AC power source 110 (e.g., in the event of a power outage). The apparatus 100 then switches to using the internal, DC power source 112 such as a battery.

The method of FIG. 2 also includes causing 204 (e.g., by the GPU selection module 118) the apparatus 100 to preferentially utilize the iGPU 106 over a dGPU 108 while using the DC power source 112. Assume that the operating system 116 or applications executed in the apparatus 100 are configured to utilize the dGPU 108 for rendering or other operations while the apparatus is using the AC power source 110. In response to determining that the apparatus 100 is using the DC power source 112, the GPU selection module 118 causes 204 the apparatus 100 to preferentially use the iGPU 106 instead of the dGPU 108. Thus, services or applications that would send instructions or jobs to the dGPU 108 are instead sent to the iGPU 106. The GPU selection module 118 causes 204 the apparatus 100 to preferentially utilize the iGPU 106 over a dGPU 108 while using the DC power source 112 using any of a variety of approaches as will be described in further detail below, including shutting down the dGPU 108, causing the dGPU 108 and iGPU 106 to exit a particular operational mode, or updating preferences in response to runtime events.

For further explanation, FIG. 3 sets forth a flow chart illustrating another example method for graphics processing unit (GPU) selection based on a utilized power source according to embodiments of the present disclosure. The method of FIG. 3 is similar to that of FIG. 2 in that the method of FIG. 3 also includes determining 202 that an apparatus 100 is using a DC power source 112 instead of an AC power source 110; and causing 204 the apparatus 100 to preferentially utilize the iGPU 106 over a dGPU 108 while using the DC power source 112.

The method of FIG. 3 differs from FIG. 2 in that causing 204 the apparatus 100 to preferentially utilize the iGPU 106 over a dGPU 108 while using the DC power source 112 includes shutting down 302 (e.g., by the GPU selection module 118) the dGPU 108. For example, the GPU selection module 118 causes the dGPU 108 to enter a Bus-Off-Chip-Mode (e.g., a D3 cold state), effectively powering off the dGPU 108. As the dGPU 108 is powered off or running at an extremely reduced power consumption state, the iGPU 106 becomes the only available option for rendering or graphics-related jobs. Accordingly, the operating system 116 or other applications will automatically select the iGPU 106 as the adapter for performing tasks that might otherwise be sent to the dGPU 108. In addition to the performance benefits of using the iGPU 106 while using the DC power source 112, power consumption of the apparatus 100 is improved as the dGPU 108 is drawing little to no power while shut down.

For further explanation, FIG. 4 sets forth a flow chart illustrating another example method for graphics processing unit (GPU) selection based on a utilized power source according to embodiments of the present disclosure. The method of FIG. 4 is similar to that of FIG. 3 in that the method of FIG. 4 also includes determining 202 that an apparatus 100 is using a DC power source 112 instead of an AC power source 110; and causing 204 the apparatus 100 to preferentially utilize the iGPU 106 over a dGPU 108 while using the DC power source 112 including shutting down 302 the dGPU 108.

The method of FIG. 4 differs from FIG. 3 in that the method of FIG. 4 also includes activating 402 (e.g., by the GPU selection module 118) the dGPU 108 in response to a display connection to the dGPU 108. As is set forth above, the dGPU 108 includes a display interface 109 for connecting external displays. While the dGPU 108 is shut down, external displays connected to the display interface 109 would not function. Accordingly, the dGPU 108 must be reactivated in order to use the external display connected to the display interface 109. For example, in some embodiments, the display connection includes a plug-in event of a display to the display interface 109. As another example, in some embodiments, the display connection includes a powering on or activation of a display connected to the display interface 109. By activating the dGPU 108 in response to the display connection, in some embodiments, jobs or processes that would be sent to the iGPU 106 while the dGPU 108 is shut down will instead be sent to the reactivated dGPU 108.

For further explanation, FIG. 5 sets forth a flow chart illustrating another example method for graphics processing unit (GPU) selection based on a utilized power source according to embodiments of the present disclosure. The method of FIG. 5 is similar to that of FIG. 2 in that the method of FIG. 5 also includes determining 202 that an apparatus 100 is using a DC power source 112 instead of an AC power source 110; and causing 204 the apparatus 100 to preferentially utilize the iGPU 106 over a dGPU 108 while using the DC power source 112.

The method of FIG. 5 differs from FIG. 2 in that causing 204 the apparatus 100 to preferentially utilize the iGPU 106 over a dGPU 108 while using the DC power source 112 includes causing 502 (e.g., by the GPU selection module 118) the iGPU 106 and the dGPU 108 to exit an operational mode prioritizing the dGPU 108 over the iGPU 106 for rendering. In some embodiments, the operating system 116 implements an operational mode that, while active and while the iGPU 106 and dGPU 108 are logically linked to the operational mode, causes the dGPU 108 to be preferentially used over the iGPU 106.

For example, a Windows™ operating system 116 includes a Hybrid Graphics (HG) mode that selects between any display adapters linked to (e.g., registered with) the HG mode. Particular applications registered with the HG mode have the operating system 116 select which of the linked display drivers to use for the rendering functions of the particular application. In this example, causing the iGPU 106 and the dGPU 108 to exit the operational mode includes unlinking the iGPU 106 and the dGPU 108 from the HG mode. In some embodiments, this is performed by causing a driver reload for the dGPU 108. By virtue of exiting the operational mode, some jobs will stop being issued to the dGPU 108. In some embodiments, if jobs stop being issued to the dGPU 108 altogether, this will cause the operating system 116 to put the dGPU 108 in a Bus-Off-Chip-Mode (D3 cold state), effectively shutting down the dGPU 108 and reducing overall power consumption. One skilled in the art will appreciate that, in some embodiments, though some applications will enumerate all available adapters (e.g., both the iGPU 106 and dGPU 108) and select the dGPU 108, the iGPU 106 will nonetheless be preferentially utilized for the majority of operations.

In some embodiments, applications registered with the operational mode (e.g., the HG mode) will select whatever adapter is driving the display of the apparatus 100. In this example, the iGPU 106 is driving the primary display (e.g., a built-in laptop monitor). Thus, the iGPU 106 will be utilized by the registered applications. In some embodiments, where the primary display is changed to an external monitor and the apparatus 100 is still using the DC power source 112, this causes the dGPU 108 to again become the default renderer for applications.

For further explanation, FIG. 6 sets forth a flow chart illustrating another example method for graphics processing unit (GPU) selection based on a utilized power source according to embodiments of the present disclosure. The method of FIG. 6 is similar to that of FIG. 2 in that the method of FIG. 6 also includes determining 202 that an apparatus 100 is using a DC power source 112 instead of an AC power source 110; and causing 204 the apparatus 100 to preferentially utilize the iGPU 106 over a dGPU 108 while using the DC power source 112.

The method of FIG. 6 differs from FIG. 2 in that causing 204 the apparatus 100 to preferentially utilize the iGPU 106 over a dGPU 108 while using the DC power source 112 includes detecting 602 (e.g., by the GPU selection module 118) a runtime event associated with an application and, in response to the runtime event, updating 604 (e.g., by the GPU selection module 118) a preference associated with the application to use the iGPU 106 for rendering. The runtime event includes, for example a 3D runtime load event generated by an application. For example, a kernel-level portion of the GPU selection module 118 intercepts the runtime event and indicates, to the operating system 116, that the iGPU 106 is the preferred adapter for rendering. Thus, causing the iGPU 106 to be preferentially utilized is performed both in response to determining that the apparatus 100 is using the DC power supply 112 and also in response to a detected runtime event for an application.

For further explanation, FIG. 7 sets forth a flow chart illustrating another example method for graphics processing unit (GPU) selection based on a utilized power source according to embodiments of the present disclosure. The method of FIG. 7 is similar to that of FIG. 2 in that the method of FIG. 7 also includes determining 202 that an apparatus 100 is using a DC power source 112 instead of an AC power source 110; and causing 204 the apparatus 100 to preferentially utilize the iGPU 106 over a dGPU 108 while using the DC power source 112.

The method of FIG. 7 differs from FIG. 2 in that the method of FIG. 7 includes displaying 702 (e.g., by the GPU selection module 118) a notification indicating that one or more executed applications should be restarted. In some embodiments, the apparatus 100 switching from using the dGPU 108 to the iGPU 106 during execution of an application will cause the executed operation to crash. As an example, assume that an application is being executed and is using the dGPU 108 when the AC power supply 110 is disconnected from an external power source, causing the apparatus 100 to instead use the DC power source 112. Shutting down the dGPU 108, causing the apparatus 100 to preferentially utilize the iGPU 106 is performed via a driver reload, or intercepting a runtime event and identifying the iGPU 106 as the preferred adapter have the possibility of causing the application using the dGPU 108 to crash.

Accordingly, in some embodiments, the GPU selection module 118 displays 702 a notification indicating that one or more executed applications should be restarted. The notification includes, for example, a pop-up notification or other user interface element. In some embodiments, the notification indicates the particular one or more executed applications that should be restarted. In some embodiments, the notification is displayed in response to determining that the apparatus 100 is using the DC power source 112. In some embodiments, the notification includes buttons or other user interface elements that, when selected, close or restart a corresponding application. In some embodiments, causing the apparatus 100 to preferentially utilize the iGPU 106 is delayed until a user interacts with the notification (e.g., dismissing it, selecting that the one or more applications should be restarted). In some embodiments, causing the apparatus 100 to preferentially utilize the iGPU 106 is delayed for a predefined amount of time after displaying the notification, thereby providing the user with some amount of time to shut down their applications prior to preferentially utilizing the iGPU 106.

For further explanation, FIG. 8 sets forth a flow chart illustrating another example method for graphics processing unit (GPU) selection based on a utilized power source according to embodiments of the present disclosure. The method of FIG. 8 is similar to that of FIG. 2 in that the method of FIG. 8 also includes determining 202 that an apparatus 100 is using a DC power source 112 instead of an AC power source 110; and causing 204 the apparatus 100 to preferentially utilize the iGPU 106 over a dGPU 108 while using the DC power source 112.

The method of FIG. 8 differs from FIG. 2 in that the method of FIG. 8 includes requesting 802 (e.g., by the GPU selection module 118), from a user, a selection of whether to prioritize using the iGPU 106 over the dGPU 108 while using the DC power source 112. For example, in response to determining that the apparatus 100 is using the DC power source 112, the GPU selection module 118 displays a notification prompting the user to select whether they would like the iGPU 106 to be preferentially used while the apparatus 100 is on DC power. Thus, the user is allowed to make the determination as to whether they will receive the performance and power savings benefits afforded by using the iGPU 106. For example, if a user does not wish to shut down or restart any applications that would crash due to the transition of using the iGPU 106, the user will choose to continue using the dGPU 108 despite the degradation of performance.

For further explanation, FIG. 9 sets forth a flow chart illustrating another example method for graphics processing unit (GPU) selection based on a utilized power source according to embodiments of the present disclosure. The method of FIG. 9 is similar to that of FIG. 2 in that the method of FIG. 9 also includes determining 202 that an apparatus 100 is using a DC power source 112 instead of an AC power source 110; and causing 204 the apparatus 100 to preferentially utilize the iGPU 106 over a dGPU 108 while using the DC power source 112.

The method of FIG. 9 differs from FIG. 2 in that the method of FIG. 9 includes detecting 902 (e.g., by the GPU selection module 118) a power transition event from using the DC power source 112 to using the AC power source 110 in the apparatus 100. For example, an AC adapter or plug connects the AC power source 110 to an external power supply. The method of FIG. 9 also includes ending 904, in response to the power transition event, the apparatus 100 preferentially utilizing the iGPU 106 over the dGPU 108. In some embodiments, this includes waking or reactivating the dGPU 108. In some embodiments, this includes registering or entering the iGPU 106 and the dGPU 108 with an operational mode preferentially utilizing the dGPU 108 (e.g., the Hybrid Graphics mode). In some embodiments, this includes updating a preference to use the dGPU 108 by a particular application (e.g., in response to intercepting a runtime event such as a 3D runtime load event.

In view of the explanations set forth above, readers will recognize that the benefits of graphics processing unit (GPU) selection based on a utilized power source include:
Improved performance of a computing system by improving performance by preferentially using the dGPU while on AC power and the iGPU while on DC power.
Improved performance of a computing system by reducing power consumption when using DC power by deactivating the dGPU.
Improved performance of a computing system by expanding user configuration options of usable GPUs.

Exemplary embodiments of the present disclosure are described largely in the context of a fully functional computer system for graphics processing unit (GPU) selection based on a utilized power source. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method for graphics processing unit (GPU) selection based on a utilized power source, the method comprising:
   determining that an apparatus is using a direct current (DC) power source instead of an Alternating Current (AC) power source; and
   causing, in response to the apparatus using the DC power source and to detecting a runtime load event associated with an application, the apparatus to preferentially utilize an integrated graphics processing unit (iGPU) over a discrete graphics processing unit (dGPU) while using the DC power source, including updating, in response to the runtime load event, a preference associated with the application to use the iGPU for rendering, wherein detecting the runtime load event associated with the application includes intercepting the runtime load event at a kernel-level and indicating to an operating system that the iGPU is to be preferentially utilized.

2. The method of claim 1, wherein causing the apparatus to preferentially utilize the iGPU over the dGPU comprises shutting down the dGPU.

3. The method of claim 2, further comprising activating the dGPU in response to a display connection to the dGPU.

4. The method of claim 1, wherein causing the apparatus to preferentially utilize the iGPU over the dGPU comprises causing the iGPU and the dGPU to exit an operational mode prioritizing the dGPU over the iGPU for rendering.

5. The method of claim 4, wherein exiting the operational mode by the iGPU and the dGPU is performed via a dGPU driver reload.

6. The method of claim 1, further comprising displaying a notification indicating one or more executed applications should be restarted.

7. The method of claim 1, further comprising requesting, from a user, a selection of whether to prioritize using the iGPU over the dGPU while using the DC power source.

8. The method of claim 1, further comprising:
   detecting a power transition event from using the AC power source to using the DC power source in the apparatus; and
   ending, in response to the power transition event, the apparatus preferentially utilizing the iGPU over the dGPU.

9. An apparatus for graphics processing unit (GPU) selection based on a utilized power source, the apparatus comprising:
an integrated graphics processing unit (iGPU); and
a discrete graphics processing unit (dGPU), wherein the apparatus is configured to perform steps comprising:
determining that an apparatus is using a DC power source instead of an AC power source; and
causing, in response to the apparatus using the DC power source and to detecting a runtime load event associated with an application, the apparatus to preferentially utilize the iGPU over the dGPU while using the DC power source, including updating, in response to the runtime load event, a preference associated with the application to use the iGPU for rendering, wherein detecting the runtime load event associated with the application includes intercepting the runtime load event at a kernel-level and indicating to an operating system that the iGPU is to be preferentially utilized.

10. The apparatus of claim 9, wherein causing the apparatus to preferentially utilize the iGPU over the dGPU comprises shutting down the dGPU.

11. The apparatus of claim 10, wherein the steps further comprise further comprising activating the dGPU in response to a display connection to the dGPU.

12. The apparatus of claim 9, wherein causing the apparatus to preferentially utilize the iGPU over the dGPU comprises causing the iGPU and the dGPU to exit an operational mode prioritizing the dGPU over the iGPU for rendering.

13. The apparatus of claim 12, wherein exiting the operational mode by the iGPU and the dGPU is performed via a dGPU driver reload.

14. The apparatus of claim 9, wherein the steps further comprise displaying a notification indicating one or more executed applications should be restarted.

15. The apparatus of claim 9, wherein the steps further comprise requesting, from a user, a selection of whether to prioritize using the iGPU over the dGPU while using the DC power source.

16. The apparatus of claim 9, wherein the steps further comprise:
detecting a second power transition event from using the AC power source to using the DC power source in the apparatus; and
ending, in response to the second power transition event, the apparatus preferentially utilizing the iGPU over the dGPU.

17. A non-transitory computer readable medium on which a computer program product is encoded, the computer program product comprising computer program instructions for graphics processing unit (GPU) selection based on a utilized power source, that, when executed, cause a computer system to perform steps comprising:
determining that an apparatus is using a DC power source instead of an AC power source; and
causing, in response to the apparatus using the DC power source and to detecting a runtime load event associated with an application, the apparatus to preferentially utilize an integrated graphics processing unit (iGPU) over a discrete graphics processing unit (dGPU) while using the DC power source, including updating, in response to the runtime load event, a preference associated with the application to use the iGPU for rendering, wherein detecting the runtime load event associated with the application includes intercepting the runtime load event at a kernel-level and indicating to an operating system that the iGPU is to be preferentially utilized.

18. The non-transitory computer readable medium of claim 17, wherein the steps further comprise:
detecting a power transition event from using the AC power source to using the DC power source in the apparatus; and
ending, in response to the power transition event, the apparatus preferentially utilizing the iGPU over the dGPU.

* * * * *